Sept. 5, 1939.  A. RASCHDOWITZ  2,172,034
DEVICE FOR MEASURING AND TESTING ELECTRIC RESISTANCES
Filed March 17, 1937

Inventor
A. Raschdowitz
By Glascock Downing & Seebold
Attys.

Patented Sept. 5, 1939

2,172,034

UNITED STATES PATENT OFFICE 2,172,034

DEVICE FOR MEASURING AND TESTING ELECTRIC RESISTANCES

Adolf Raschdowitz, Vienna, Austria, assignor to the firm Elektrische Gluhlampenfabriken Joh. Kremenezky A. G., Vienna, Austria Application March 17, 1937, Serial No. 131,501
In Austria March 19, 1936

8 Claims. (Cl. 175—183)

This invention relates to a device for measuring and testing electric resistances, which enables the resistance value to be read or checked off continuously from the beginning to the end of the resistance to be tested. For this purpose a pointer connected with the measuring instrument is arranged to play in front of a preferably easily interchangeable curve sheet which is caused to carry out a movement derived from the relative movement between the resistance to be measured and the current collecting member which touches this latter as a feeler for the continuous registering of the resistance value. On this curve sheet there are plotted or traced one or more groups of curves each consisting preferably of three curves of which the middle curve represents the desired course or value of the resistance, while the upper curve corresponds to the appropriate positive tolerance and the lower to the minus tolerance or admissible limit of error. If the tip of the pointer remains within the area bounded by the two outer curves representing the admissible limits of error while the curve sheet travels past it this indicates that the resistance to be measured has the required resistance value or coefficient throughout. If however the tip of the pointer is deflected upwards of the plus tolerance curve or downwards of the minus tolerance curve this indicates that at the corresponding part of the resistance under test the coefficient of resistance is too high or too low, respectively. In accordance with the invention there is combined with the above described measuring device a grinding or polishing contrivance which enables the value of resistance of the resistance under test to be increased, either over the entire length of the resistance or at certain parts or points thereof, and that again while being checked by the described measuring device.

A form of construction embodying the invention is shown, by way of example, in the accompanying drawing, in which.

Figure 1:
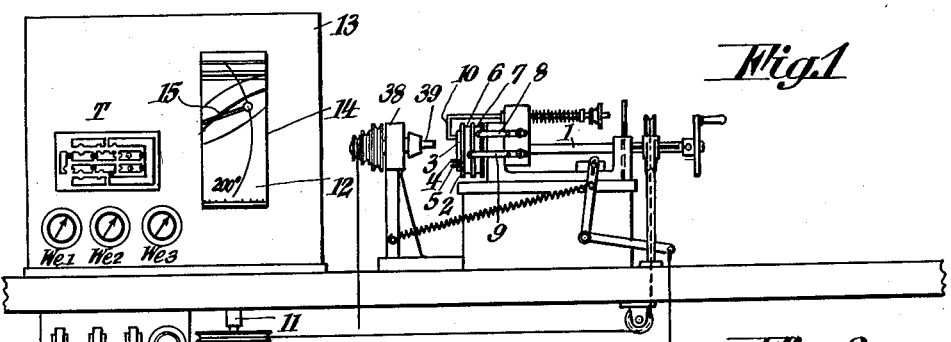
Fig. 1 is a diagrammatic front elevation of the combined measuring and polishing device.

To a shaft 1, which may for instance be rotated by means of a hand-wheel, there is attached a head 2 which serves for the reception of the resistance 3 to be measured. In the constructional example shown in the drawing this resistance to be measured is supposed to be in the form of a plate or sheet, say by the application of a resistance layer in the form of an annular segment to a circular stamped-out sheet of insulating material. The arrangement is such that the ends of the resistance layer, which may if desired be provided with terminals or end contacts, are conductively connected to two contacts 4, 5 mounted on the head 2 and connected in their turn to metal rings 6, 7, on the head 2, upon which rings there rub resiliently supported brushes 8, 9. When the resistance 3 has been placed in position on the head 2 a current collecting member 10 bears against the resistance layer. The brushes 8 and 9, and the current collecting member 10 are connected to the measuring appliance in a manner to be described in due course.

Figure 3:
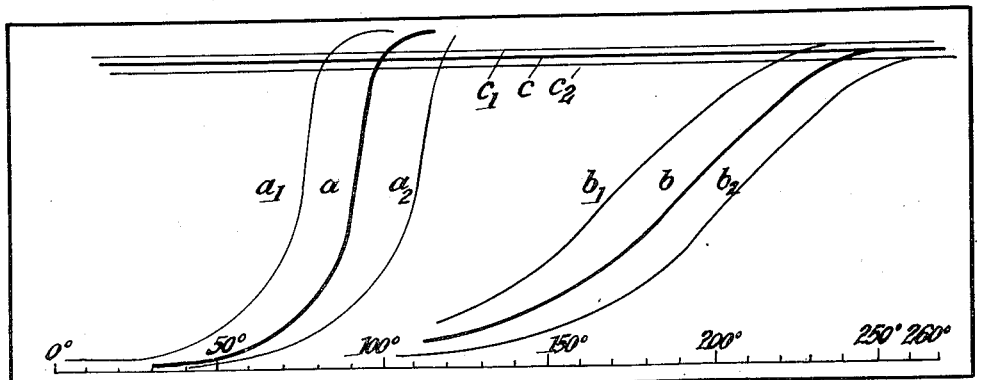
Fig. 3 shows a curve sheet developed on one plane.

Through the instrumentality of suitable transmission means, the axle 11 of a drum 12 is driven from the shaft 1, so that this drum moves proportionately to the movement of the resistance 3. The drum 12 is housed in a casing 13, and a portion thereof is visible through an aperture 14 in this casing. The envelope of the drum 12 is formed of a sheet of Celluloid or the like on which where are traced in the manner shown in Fig. 3 a plurality of groups of curves. Each group of curves consists of three curves $a$, $a_1$, $a_2$, $b$, $b_1$, $b_2$, and $c$, $c_1$, $c_2$, respectively. The group of curves $a$, $a_1$, $a_2$ on the one hand, and the family of curves $b$, $b_1$, $b_2$ on the other hand belong to two different ranges of measurement of the measuring instrument, which are employed in sucession in the measuring of the resistance. The curves $c$, $c_1$, $c_2$, which are formed of straight lines parallel to each other, are used when it is desired to measure not the course of the resistance curve but the total value of the resistance. The curves $a$ and $b$ represent the ideal of the desired course of the resistance curve (and the curve $c$ the ideal total resistance), while the curves $a_1$, $b_1$, $c_1$ represent the plus tolerance or limit of error admissible, and the curves $a_2$, $b_2$, $c_2$ the minus tolerance. In the case of the curve sheet shown in Fig. 1 it is assumed that two ranges of measurement of the measuring instrument are used in measuring the course of the resistance, although in many cases one measuring range will be sufficient, while for other cases it may be necessary to use more than two ranges of measurement. In the said cases instead of the two groups of curves $a$, $a_1$, $a_2$, and $b$, $b_1$, $b_2$ there must be traced on the curve sheet either only one group of curves or more than two groups of curves. Furthermore, the shape of the curves depends on the requirements made of the course of the resistance in each case. It is therefore advisable to arrange for the curve sheets to be readily interchangeable.

Upon the curve sheet there plays a pointer 15 pertaining to the measuring instrument I which may take the form for example of a moving coil galvanometer. For the setting of the zero point of the instrument there serves a power current key switch 40. To facilitate observing of the pointer 15 in its movements relatively to the curves, the drum is illuminated, for example by means of a lamp provided inside the drum.

To the axle 11 of the drum 12 there is secured the revolving arm 16 of a collector K having six segments in the example shown in the drawing. The individual segments 17 to 22 of this collector are electrically connected to the appropriate elements 23 to 28 of a switch-board T. The switch-board T also comprises further elements 29, 30, 31, and 32 which may be selectively connected to the elements 23 to 28 by means of contact pegs or the like.

The measuring instrument is capable of being adjusted for three ranges of measurement. These three ranges of measurement are controlled by means of three feeble current relays $R_1$, $R_2$, and $R_3$ which in their turn are put in and out of operation in dependence upon how the inner elements 23 to 28 on the switch-board T are connected to the outer elements 29 to 32 by the plugging effected by hand. Each of the relays $R_1$, $R_2$, $R_3$ is provided with two closed-circuit contacts 33, the relay $R_1$ being connected with the element 29, the relay $R_2$ with the elements 30 and 31, and the relay $R_3$ with the element 32 pertaining to the switch-board T, through the instrumentality of these contacts. With the relays $R_1$, $R_2$, $R_3$ there are also associated working current contacts 34, two such contacts being allotted to each of the relays $R_1$ and $R_2$, and only one to the relay $R_3$. The different measurement ranges of the measuring instrument 16 are formed of resistances $W_1$, $W_2$, $W_3$, with the shunt resistances $W_{s1}$ and $W_{s2}$, and the resistances $W_{e1}$, $W_{e2}$, and $W_{e3}$ serving for correction. As already mentioned, the switching on and off of these ranges of measurement is effected by means of the relays $R_1$, $R_2$, and $R_3$, a possibility of enlargement being provided in respect of the range of measurement controlled by the relay $R_1$, inasmuch as a further resistance $W_1$, together with shunt resistance $W_{s1}$, may be switched in parallel to $W_1$ and $W_{s1}$ by means of a switch S.

Figure 2:
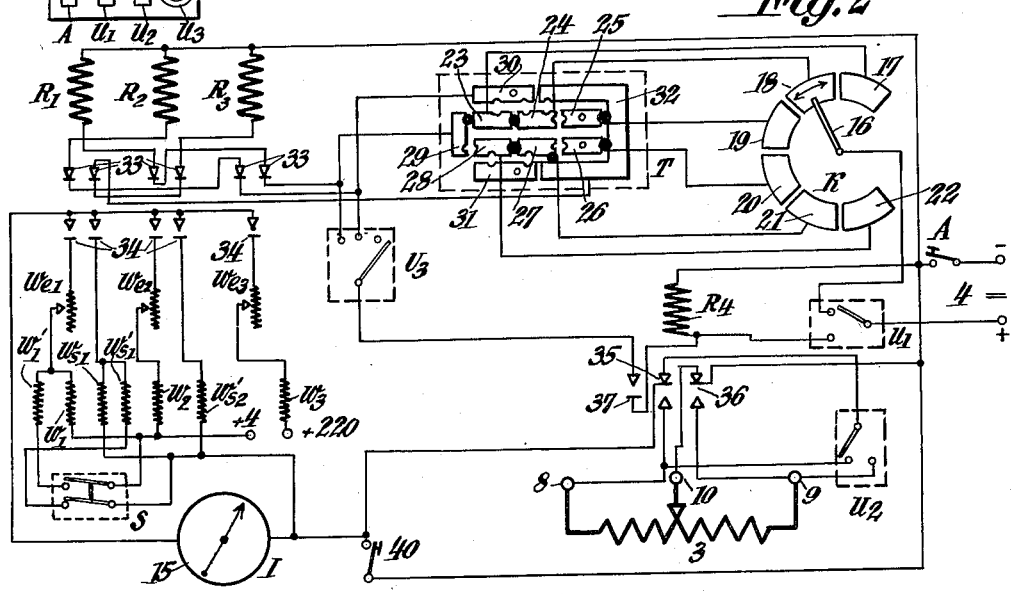
Fig. 2 is a diagram of connections.

A feeble current relay $R_4$ controlled by a switch $U_1$ is provided with two closed-circuit and working current contacts 35 and 36, as also with a working current contact 37. When the relay $R_4$ is switched off owing to the setting of the switch $U_1$ shown in the drawing, a further switch $U_2$ being set as shown in the drawing, the apparatus is adjusted for testing the resistance leaves as to the course of their resistance curves, and that in the direction from the end contact 8 towards the end contact 9. At the same time, with the switch-board T plugged in the manner shown, by way of example, in Figs. 1 and 2 both the ranges of measurement controlled by the relays $R_1$ and $R_3$ are put in readiness. As long as the revolving arm 16, in its movement derived from the movement of the shaft 1 driving the leaf resistor, travels over the collector segments 17 and 18 the range of measurement controlled by the relay $R_1$ is used, and as long as this is the case the pointer 15 of the instrument I plays over the group of curves $a$, $a_1$, $a_2$ on the curve chart 12.

When the revolving arm 16 passes over on to the collector segment 19 the apparatus is switched over to the range of measurement controlled by the relay $R_3$, whereupon the tip of the pointer 15 of the measuring instrument, which at the moment when this transition is effected, is situated at the upper part of the group of curves $a$, $a_1$, $a_2$, is so displaced that it comes into a position at the lower end of the group of curves $b$, $b_1$, $b_2$. As the revolving arm 16 travels over the collector segments 19 to 22 the relay $R_3$ remains permanently switched on, and the pointer 15 plays within the area of the curve chart bounded by the curves $b_1$ and $b_2$. It is thus possible to keep a constant check on whether the resistor to be measured and tested conforms to the prescribed resistance curve. The closer the tip of the pointer remains to the curves $a$ and $b$ the more accurately does the course of the resistance conform to the prescribed ideal curve. The coefficient of resistance does not require correction as long as the tip of the pointer 15 remains within the curves representing the admissible limits of error. If however the tip of the pointer falls at any point below the lower tolerance curve $a_2$ or $b_2$ material must be removed from the resistance layer at the corresponding portion of the resistor 3. This is rendered possible in the device shown in the drawing, by placing the leaf resistor 3 opposite a grinding or polishing device 38 which is driven independently of the resistor to be tested, and which can be brought to bear upon the latter while this resistor is in movement or at a standstill. For this purpose there may be provided any means with the aid of which the implement, e.g. a small cylindrical piece of felt 39, carried by the polishing device 38, and the head 2 carrying the leaf resistor 3, may be brought nearer to each other until they touch. If the pointer 15 of the measuring appliance indicates too low a coefficient of resistance at any part of the resistor under test, by becoming deflected below the lower tolerance curve, the head 2 is brought to a standstill and material removed from the resistance layer, at the point concerned, by means of the rotating piece of felt 39, until the tip of the pointer 15 moves above the lower tolerance curve again. If the tip of the pointer remains too low throughout the testing of the entire resistance layer, that is to say more particularly if it remains below the lower tolerance curve, material is removed uniformly over the entire length of the resistance layer by operation of the shaft 1. This uniform removal of resistance material, which at the same time effects a polishing of the surface of the resistance layer, is to be regarded as the usual procedure, since it is advisable to make the resistance layer of the register 3 from the outset somewhat thicker than is actually necessary for the desired final coefficient of resistance, so that at the commencement of the treatment of the resistor by means of the felt cylinder 39 the pointer 15 will constantly play below the lower tolerance curves. It is then only under the grinding or polishing action of the felt 39 that the coefficient of resistance rises to the desired level, this alteration of resistance being indicated continuously for the entire length of the resistance layer by means of the pointer 15.

By transferring the switch $U_2$ to its second setting it becomes possible to test the resistance course of the resistor 3 in the direction from the end contact 9 towards the end contact 8. In this case the drum 12 is provided with a different curve chart from that previously used for measuring the resistance in the direction from the contact 8 towards the contact 9.

In order to test the total resistance of the resistor 3 the relay $R_4$ is switched on, for which purpose the switch $U_1$ is transferred into its second position. At the same time the proper range of measurement of the measuring instrument must be put in readiness by suitable setting of a switch $U_3$. In this testing for total resistance the tip of the pointer 15 is required to remain between the straight lines $c_1$ and $c_2$ on the curve chart. Any falling off of the indicated coefficient of resistance below the lower limit of error may be corrected in the already described manner by removal of resistance material with the aid of the polishing device, while keeping a constant check on alteration of resistance resulting from this polishing operation.

The entire device may be switched on and off by means of a master switch A.

I claim:

1. A device for the measurement of electric resistances comprising a pointer, a measuring instrument connected therewith, a readily interchangeable curve chart on said instrument, means for movably supporting a resistance to be tested, a current collecting member adapted to feel along said resistance during movement of the latter, and means for moving said chart in dependence on the relative movement between the current collecting member and the resistance to be tested.

2. A device according to claim 1, in which the curve chart has traced thereon, groups of curves, each group preferably consisting of three curves, while in each of said groups, the middle curve represents the desired resistance value, the upper the appropriate resistance, plus tolerance curve and the lower represents the minus tolerance corresponding to an admissible limit of error.

3. A device according to claim 1 in which said curve chart has traced thereon groups of curves each group corresponding to another range of measurements in the measuring instrument consisting of three curves, representing an upper, a lower and a mean resistance value, and relays adapted to control different ranges of measurements in said instrument.

4. A device according to claim 1 in which said curve chart has traced thereon groups of curves, each group consisting of three curves, representing an upper, a lower and a mean resistance value, and relays adapted to control different ranges of measurements on said instrument a collector having an arm mechanically connected with said chart, and a manually operable contacting device forming an intermediary between the relays and said collector.

5. A device according to claim 1, a change over switch adapted for testing the resistance course at will from either end of the resistance.

6. A device according to claim 1 in which said curve chart has traced thereon groups of curves, each group consisting of three curves representing an upper, a lower and a mean resistance value, and relays adapted to control different ranges of measurements in said instrument, and another relay adapted to control connections respectively to the ends of the resistance and to said current collector, whereby a reading of the total resistance only may be obtained independent of the relative movement between resistance and current collector.

7. A device according to claim 1 provided with a grinding and polishing device driven by means therefore operated independently of the means for movably supporting the resistance to be tested, said device being adapted to be brought to bear upon the resistance selectively while the latter is moving and while the same is at a standstill, for the purpose of removing material from the resistance layer and/or of polishing the surface of this resistance layer and an indicating member adapted to give a constant check.

8. A device according to claim 1, in which the curve chart has traced thereon groups of curves, each group consisting of three curves while in each of said groups the middle curve represents the desired resistance value, the upper curve the approximate resistance plus tolerance curve and the lower curve represents the minus tolerance corresponding to an admissible limit of error, each of the groups of curves corresponding to a different range of measurements of the measuring instrument, and automatic means for switching over of the measuring instrument to the different ranges of measurement during the relative movement between the resistance to be tested and the current collecting member feeling along the resistance.

ADOLF RASCHDOWITZ.